United States Patent Office 3,514,948
Patented June 2, 1970

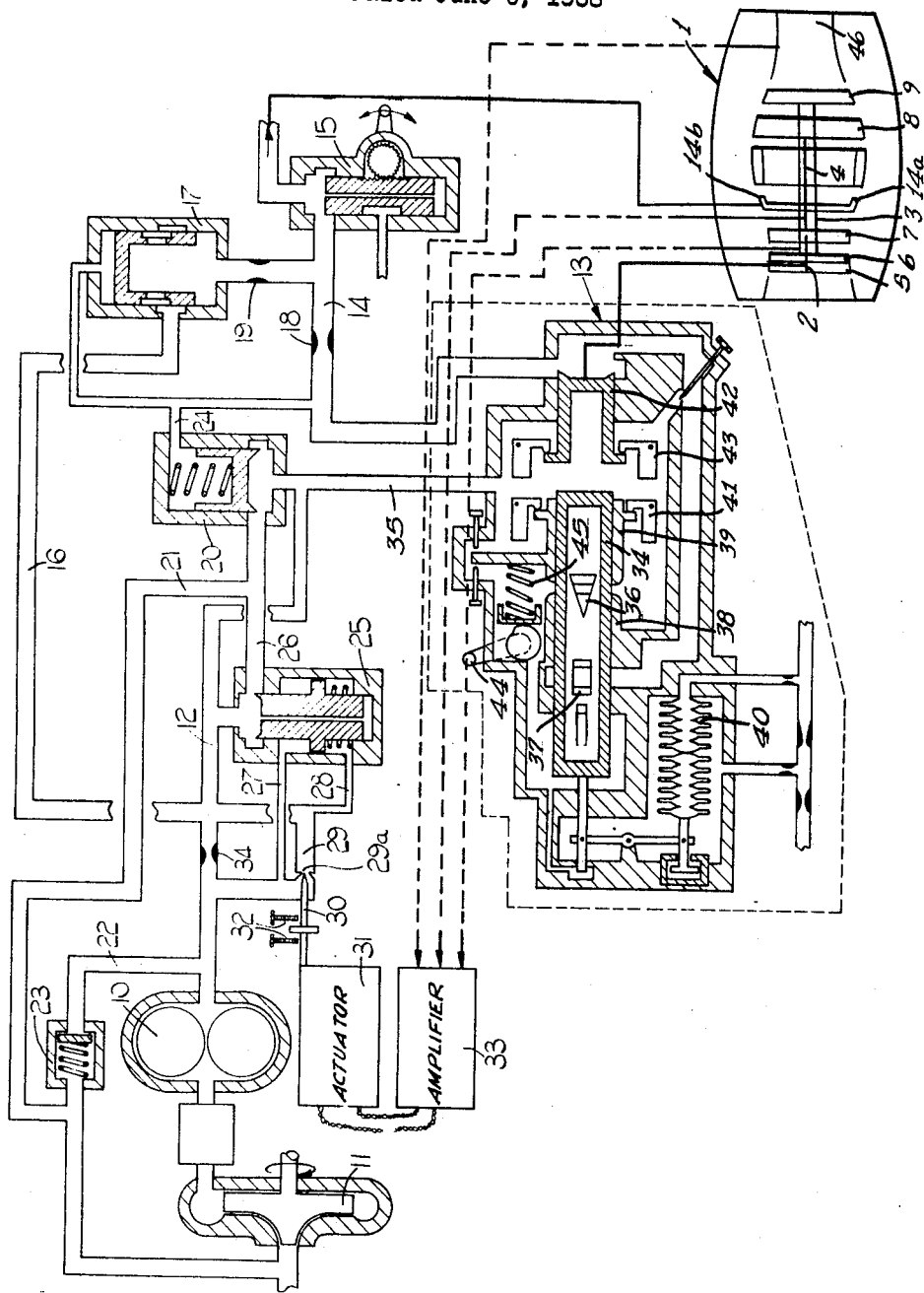

3,514,948
FUEL CONTROL SYSTEMS FOR GAS TURBINE ENGINES
Eugene Harold Warne, Solihull, England, assignor to Joseph Lucas (Industries) Limited, Birmingham, England
Filed June 6, 1968, Ser. No. 734,934
Int. Cl. F02c 9/08, 3/06
U.S. Cl. 60—39.28          5 Claims

ABSTRACT OF THE DISCLOSURE

A gas turbine engine fuel control system comprising a pump, passage means from the pump to the engine, a fuel control means in the passage means, a spill passage with a spill valve sensitive to the pressure drop created by the fuel control means, and a further spill valve sensitive to changes in one or more parameters related to engine running conditions.

---

This invention relates to fuel control systems for gas turbine engines and has for its object to provide such a system in a convenient form.

In accordance with the present invention, a fuel control system for a gas turbine engine comprises a pump, supply passage means between the pump and the engine, fuel control apparatus in said passage means, a spill passage for the return of fuel delivered by the pump in excess of that required by the engine, a spill valve in said spill passage, the position of which is determined by the pressure drop created by the fuel control apparatus, and a further spill valve associated with the spill passage, the further spill valve affording further return of fuel and being responsive to changes of one or more parameters related to engine running conditions.

The invention will now be described by way of example with reference to the accompanying drawing, the single figure of which illustrates diagrammatically a fuel system constructed in accordance with the invention.

The system is intended to supply fuel to a gas turbine engine identified at 1 in the drawing. The engine has three independently rotatable shafts 2, 3, 4, having respective compressors 5, 6, 7 fixed thereto. The shafts 3 and 4 carry respective turbines 8, 9. Between the compressors and the turbines is combustion equipment supplied with liquid fuel through a manifold 14a carrying burners 14b.

The fuel system illustrated has a positive displacement type pump 10 which, in this example, is a gear pump, and there is also a centrifugal type backing pump 11 which supplies fuel to the gear pump 10 from a reservoir (not illustrated). Both pumps 10 and 11 are adapted to be driven by the engine with which the fuel system is associated, and the fuel is delivered along a supply passage 12 to a control apparatus 13, which, in accordance with engine operating conditions, controls flow of fuel to the engine. From this apparatus 13 fuel flows through a passage 14 to manifold 14a and burners 14b in the engine 1. At a position between the burners and the control apparatus 13 in the passage 14 is a shut-off cock 15.

The apparatus 13 comprises an apertured sleeve 34 through which fuel is metered. The fuel enters the interior of the sleeve 34, from a passage 35, through a triangular opening 36 and leaves it through an opening 37 communicating with the passage 14 which leads to the engine burners 14b. To control the quantity of fuel delivered, the sleeve 34 is adjusted lengthwise in relation to a fixed sleeve 38 and a further movable outer sleeve 39 is also adjusted to vary the area of the triangular opening 36 which is available for the flow of fuel therethrough. Lengthwise adjustment of the sleeve 34 is accomplished by a capsule 40 which is subject to changes in pressures in the compressor stage of the engine 1. Adjustment of the sleeve 39 is by a set of weights 41 which are rotated at the speed of the engine shaft 3, through a drive connection (not shown). A further sleeve 42 controlled by a further set of weights 43 controls the output from the apparatus 13 to the passage 14. The sleeve 42 is driven by the shaft 2 in the engine.

A manual control 44 is also provided for presetting a spring 45 acting against the sleeve 39 in opposition to the action of the weights 41.

Also arranged to receive fuel from the pump 10 is a further passage 16 which communicates with the passage 14 through a linking valve 17. The linking valve 17 is so arranged that the pressures in the passages 14 and 16 are equalized, although the proportion of the fuel from the pump 10 flowing through the passages 14 and 16 is dependent upon the sizes of a pair of restrictors 18, 19 in the passages 14 and 16 respectively.

The pump 10 is arranged to deliver a quantity of fuel to the system in excess of the requirements at the engine, and the excess fuel is spilled through a valve 20 which permits communication between the passage 12 and a spill passage 21 leading to the upstream side of the backing pump 11. There is a pressure relief passage 22 incorporating a spring-loaded pressure relief valve 23, which also affords communication between the passage 12 at the outlet side of the pump 10, and the spill passage 21.

The spill valve 20 has a spring-loaded member which is positioned in a body in accordance with the pressure drop obtaining across the control apparatus 13. To achieve this one side of the member of the valve 20 is directly subjected to the pressure in the passage 12 and the other is subjected to that in a passage 24 communicating with the passage 14 at the outlet side of the control apparatus 13.

In the system there is also provided a further spill valve 25 which is also in the form of a spring-loaded member mounted within a body. This further spill valve is arranged to permit additional spill of fuel from the passage 12 into the spill passage 21 through a further spill passage 26.

The position of the member in the valve 25 is determined by the difference in pressures obtaining in a pair of passages 27, 28 disposed at the upstream and downstream sides respectively of a variable restrictor 29a in a passage 29. The restrictor 29a is formed by a movable needle 30. The travel of the needle 30 is determined by an electrical actuator device 31. There are stops 32 for limiting the permitted travel of the needle 30, and the actuator 31 is electrically connected to an electrical amplifier 33 which receives signals, in this instance, responsive to three parameters which are: speed of the engine shaft 3, a temperature signal obtained from any convenient part of the engine such as the jet pipe 46, and speed of the further shaft 4.

In parallel with the restricted passage 29 and in the passage 12 is a fixed restrictor 34, the size of which determines the characteristic response of the valve 25 to the pressure drop occurring across the restrictor 29a.

It is to be understood that the actuator 31 and the amplifier 33 can take any convenient form, and the signals applied to them from the two shafts and in accordance with the temperature signal from the engine can be obtained in any convenient way.

Having thus described my invention what I claim as new and desire to secure by Letters Patent is:

1. A fuel control system for a gas turbine engine comprising a pump, main passage means between the pump and the engine, fuel control apparatus in said main passage means, said fuel control apparatus being arranged to control the supply of fuel in accordance with engine operating conditions, a spill passage connected to said main passage means upstream of the fuel control apparatus, said spill passage permitting the return of fuel delivered by the pump in excess of that required by the engine, a spill valve in said spill passage, further passages whereby the opening of said spill valve is controlled in accordance with the pressures at the upstream and downstream side of the fuel control apparatus, a further spill passage connected to said main passage means, said further spill passage permitting further return of fuel, a further spill valve in said further spill passage, and means responsive to changes in one or more parameters related to engine running conditions, said means being arranged to control the opening of said further spill valve.

2. A fuel control system as claimed in claim 1 in which the means for controlling the further spill valve comprises a variable restrictor in a passage in parallel with the main passage means, the variation of said restrictor being controlled in accordance with changes in said parameter or parameters, and creating a pressure drop which is applied to a member of said further spill valve to control its opening.

3. A fuel control apparatus as claimed in claim 2 including an electrical actuator which receives signals related to said parameter or parameters and which controls said variable restrictor.

4. A fuel control apparatus as claimed in claim 1 in which the further spill passage is also connected to the main passage means at a position upstream of the fuel control apparatus.

5. A fuel control system as claimed in claim 1 including transmission means for transmitting signals related to engine shaft speeds and temperatures to said means for controlling the further spill valve.

References Cited

UNITED STATES PATENTS

| 2,688,229 | 9/1954 | Lee | 60—39.28 |
| 2,747,369 | 5/1956 | Lawrence. | |
| 2,950,597 | 8/1960 | Clarke | 60—39.28 |
| 3,049,139 | 8/1962 | Thompson et al. | 60—39.28 X |
| 3,131,750 | 5/1964 | Turner | 60—39.28 |
| 3,164,202 | 1/1965 | Johnson | 60—39.28 X |
| 3,177,921 | 4/1965 | Turner | 60—39.28 |
| 3,368,349 | 2/1968 | Johnson | 60—39.28 |

AL LAWRENCE SMITH, Primary Examiner

U.S. Cl. X.R.

60—39.16